(12) United States Patent
Tsai et al.

(10) Patent No.: US 9,939,128 B2
(45) Date of Patent: Apr. 10, 2018

(54) LED LAMP AND OPTICAL LENS THEREOF

(71) Applicant: KAISTAR Lighting (Xiamen) Co., Ltd, Xiamen (CN)

(72) Inventors: Sheng-Lung Tsai, Xiamen (CN); Jenn-Yuan Hsu, Xiamen (CN)

(73) Assignee: KAISTAR LIGHTING (XIAMEN) CO., LTD., Xiamen (CN)

( * ) Notice: Subject to any disclaimer, the term of this patent is extended or adjusted under 35 U.S.C. 154(b) by 3 days.

(21) Appl. No.: 15/189,186

(22) Filed: Jun. 22, 2016

(65) Prior Publication Data

US 2017/0023206 A1   Jan. 26, 2017

(30) Foreign Application Priority Data

Jul. 21, 2015 (CN) .......................... 2015 1 0429146

(51) Int. Cl.
| | |
|---|---|
| *F21V 5/04* | (2006.01) |
| *F21V 5/08* | (2006.01) |
| *G02B 19/00* | (2006.01) |
| *F21Y 115/10* | (2016.01) |
| *F21V 17/06* | (2006.01) |
| *F21W 131/103* | (2006.01) |

(52) U.S. Cl.
CPC ................ *F21V 5/045* (2013.01); *F21V 5/08* (2013.01); *G02B 19/0028* (2013.01); *G02B 19/0061* (2013.01); *F21V 17/06* (2013.01); *F21W 2131/103* (2013.01); *F21Y 2115/10* (2016.08)

(58) Field of Classification Search
CPC ...................................................... F21V 5/045
USPC ...................................................... 362/311.02
See application file for complete search history.

(56) References Cited

U.S. PATENT DOCUMENTS

| | | | |
|---|---|---|---|
| 9,689,554 B1* | 6/2017 | Householder | ............. F21V 5/08 |
| 2012/0287649 A1* | 11/2012 | Kelley | .................... F21V 5/002 |
| | | | 362/335 |
| 2014/0016326 A1* | 1/2014 | Dieker | .................... F21V 13/04 |
| | | | 362/308 |

* cited by examiner

*Primary Examiner* — Toan Ly

(74) *Attorney, Agent, or Firm* — Hemisphere Law, PLLC; Zhigang Ma

(57) ABSTRACT

The disclosure relates to an LED lamp and an optical lens thereof. The optical lens includes a dome structure and a protrusion structure, the dome structure has an external surface, the protrusion structure is disposed on the external surface of the dome structure; the protrusion structure has a first optical surface and a first optical side connected with the first optical surface, the first optical surface and the external surface are connected to form a first boundary, the first optical side and the first boundary are inclined. The disclosure further provides an LED lamp. The LED lamp and the optical lens thereof above can improve optical efficiency.

16 Claims, 8 Drawing Sheets

LED LAMP AND OPTICAL LENS THEREOF

FIELD OF THE DISCLOSURE

The present disclosure relates to an LED illumination technical field, and more particularly to an LED lamp and an optical lens.

BACKGROUND OF THE DISCLOSURE

In recent years, a light emitting diode (LED) lamp has been undergoing a rapid growth and gradually stepping into the general illumination market. Compared with a conventional incandescent tungsten filament bulb and a fluorescent lamp, an LED lamp makes use of the superiority in small size, energy-saving, environment-friendly and long lifespan to achieve an appellation of green light source.

Referring to FIG. 1, a structural view of a conventional optical lens applied in an LED lamp. As shown in FIG. 1, an optical lens 10 includes a mounting pedestal 11, a dome structure 13 disposed on the mounting pedestal 11, and a protrusion structure 15 outwardly protruding from the dome structure 13 along a direction away from the mounting pedestal 11. The dome structure 13 has an external surface 131, the protrusion structure 15 has a first optical surface 151, a first optical side 153, a second optical surface 155 and a second optical side 157. The first optical surface 151, the first optical side 153, the second optical surface 155 and the second optical side 157 are connected successively. The first optical side 153 and the second optical side 157 are perpendicular to the external surface 131 of the dome structure 13.

However, referring to FIG. 2, it is a light pattern simulation diagram of the optical lens 10 shown in FIG. 1. As seen from FIG. 2, it can be found that ray L1 in rays from the optical lens 10 is radiating along a direction close to the horizontal line, when the optical lens 10 is applied as a streetlight, the ray L1 will not hit the road, which can cause loss in optical efficiency.

SUMMARY OF THE DISCLOSURE

Therefore, aiming at the previous insufficiency in the foregoing related art, the disclosure provides an LED lamp and an optical lens to solve the problem of low optical efficiency of an optical lens.

Specifically, an embodiment of the disclosure provides an optical lens, including a dome structure and a protrusion structure, the dome structure contains an external surface, the protrusion structure is disposed protruding from the external surface of the dome structure; the protrusion structure contains a first optical surface and a first optical side connected with the first optical surface, the first optical surface and the external surface are connected to form a first boundary, the first optical side and the first boundary are inclined.

In an embodiment of the disclosure, an angle between the first optical side and the first boundary is 0~75 degrees.

In an embodiment of the disclosure, the angle between the first optical side and the first boundary is 30 degrees.

In an embodiment of the disclosure, the protrusion structure further includes a second optical surface and a second optical side, the second optical surface and the first optical surface are opposite, the second optical side and the first optical side are opposite, the first optical surface, the first optical side, the second optical surface and the second optical side are connected successively.

In an embodiment of the disclosure, a shape of the second optical side is same with that of the first optical side.

In an embodiment of the disclosure, the second optical surface is a curved surface.

In an embodiment of the disclosure, the first optical surface, the first optical side and the second optical side are planes.

In an embodiment of the disclosure, the optical lens further includes a mounting pedestal and a plurality of mounting holes are defined on the mounting pedestal; the dome structure is disposed on the mounting pedestal.

An embodiment of the disclosure likewise provides an LED lamp, including an LED light source and an optical lens covering the LED light source, the optical lens is any optical lens in the embodiments above.

In an embodiment of the disclosure, the LED light source includes a COB substrate and one or more LED chips disposed on the COB substrate.

In the optical lens and LED lamp above, as the first optical side and the first boundary are inclined, when the rays hit the first optical side, the light transmission direction can be adjusted, in order to improve optical efficiency.

In order to clearly illustrate the disclosure, the following figures will be described in detail, the drawings are merely for explanation instead of limitation, and the claims should be referred as well. Furthermore, the figures are not sketched in scale except for other declaration announced, the purpose of the drawings is to illustrate structures and processes of the corresponding description roughly.

BRIEF DESCRIPTION OF THE DRAWINGS

Embodiments of the present disclosure are described in detail with reference to the accompanying drawings as follows.

DETAILED DESCRIPTION OF PREFERRED EMBODIMENTS

Embodiments of the present disclosure are described in detail with reference to the accompanying drawings as follows to better understand the purpose, characteristics and merits of the LED lamp and optical lens thereof of the disclosure.

Figure 3:
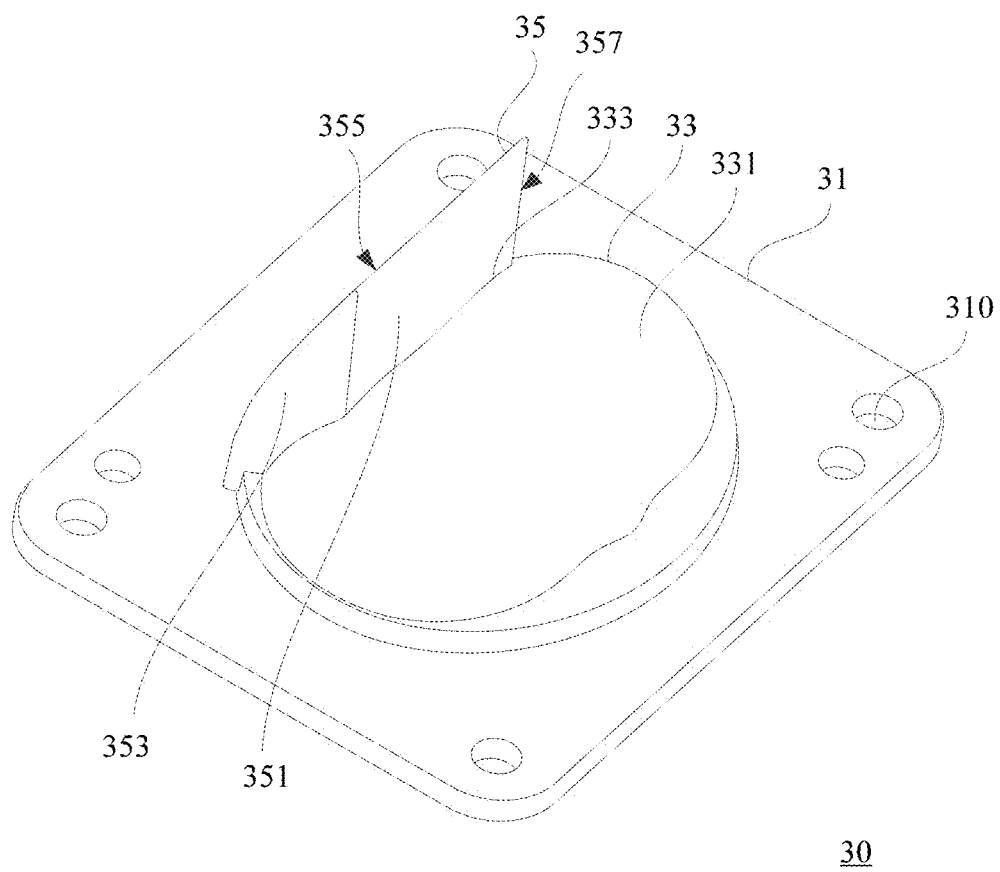
FIG. 3 is a structural diagram of an optical lens according to an embodiment of the disclosure.

Referring to FIG. 3, an optical lens 30 provided by an embodiment of the disclosure includes a mounting pedestal 31, a dome structure 33 and a protrusion structure 35. A plurality of mounting holes 310 are defined on the mounting pedestal 31. The dome structure 33 with an external surface 331 is disposed on the mounting pedestal 31. The dome structure 33 and the mounting pedestal 31 can be integrated. The protrusion structure 35 with a first optical surface 351 and a first optical side 353 is disposed protruding from the external surface 331 of the dome structure 33. The first optical surface 351 and the first optical side are connected. The first optical surface 351 and the external surface 331 of the dome structure 33 are connected to form a first boundary 333. The first optical side 353 and the first boundary 333 are inclined, in other words, the first optical side 353 and the first boundary 333 are not orthogonal. Rays can be distributed more even when entering the optical lens 30 and radiated at a certain angle due to the first optical side 353 and the first boundary 333 are inclined, which means the optical efficiency of the optical lens 30 can be improved.

Figure 4:
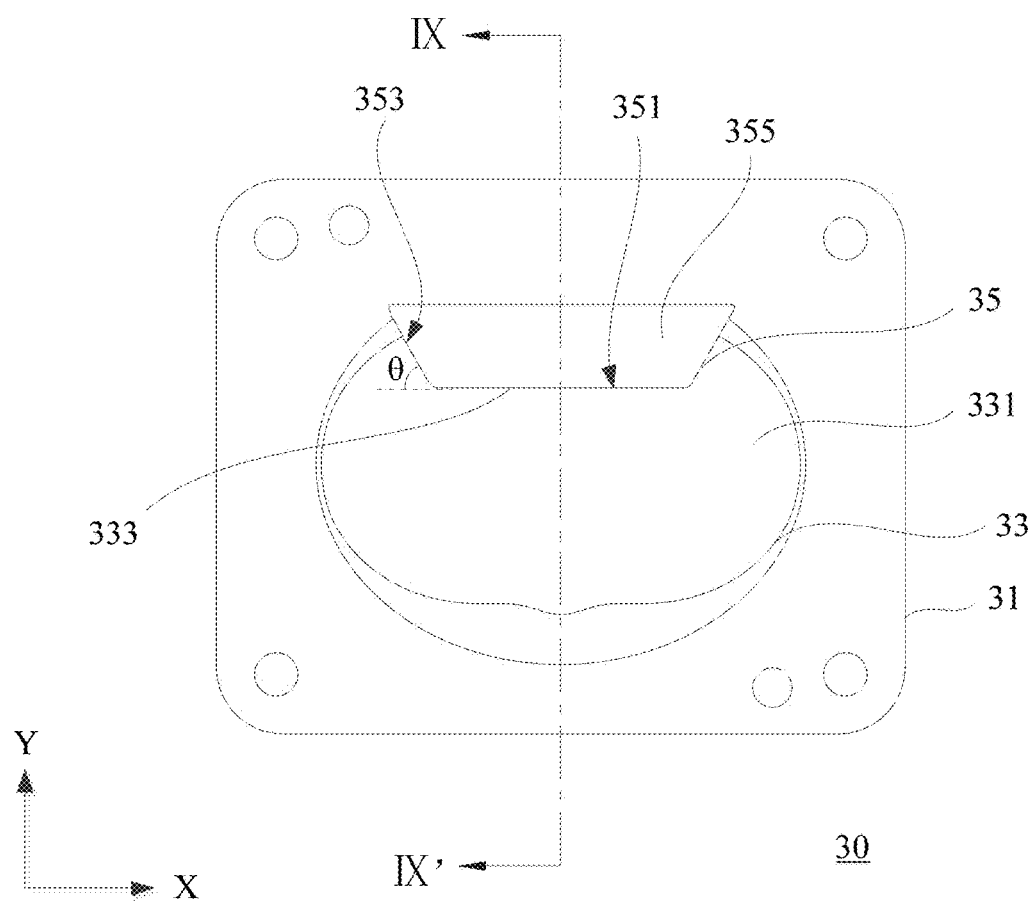
FIG. 4 is a top view of the optical lens shown in FIG. 3.

Referring to FIG. 4 and FIG. 3 altogether, the first optical side 353 and the first boundary 333 are inclined, an angle between which can be 0~75 degrees. In the embodiment, an angle θ between the first optical side 353 and the first boundary 333 is 30 degrees.

Figure 5:
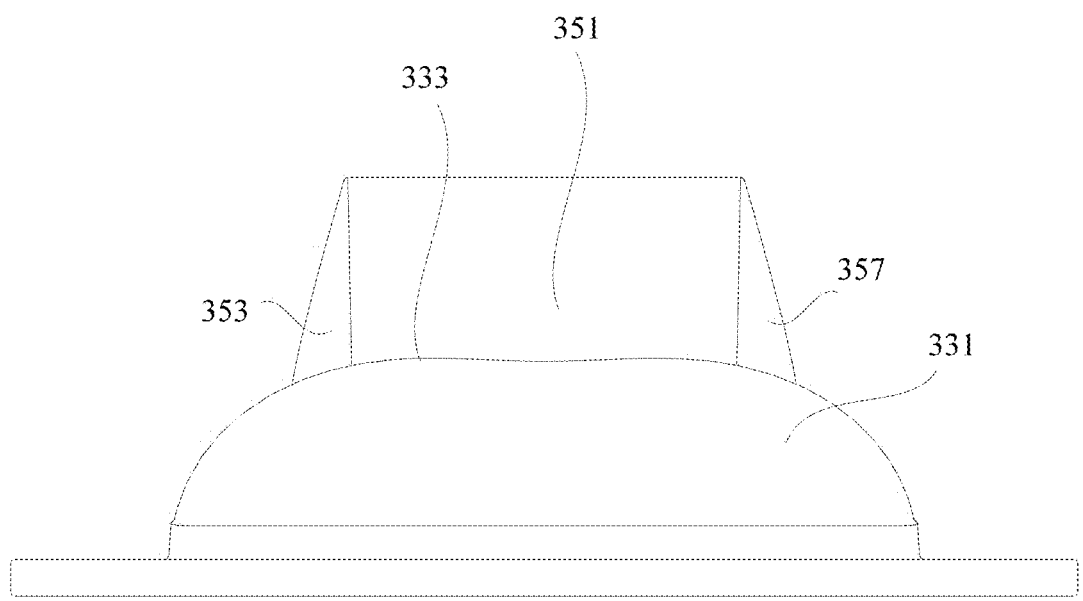
FIG. 5 is a front view of the optical lens shown in FIG. 3.

Referring to FIG. 3~FIG. 5 altogether, in the embodiment, the protrusion structure 35 further includes a second optical surface 355 and a second optical side 357. The second optical surface 355 and the first optical surface 351 are opposite, the second optical side 357 and the first optical side 353 are opposite, and the first optical surface 351, the first optical side 353, the second optical surface 355 and the second optical side 357 are connected successively, which can form a surface of the protrusion structure 35. Specifically, in the embodiment, the first optical side 353 and the second optical side 357 are same in shape, and distributed symmetrically to a central axis in Y direction.

The second optical surface 355 can be a curved surface. The first optical side 353 and the second optical side 357 can be planes.

Figure 1:
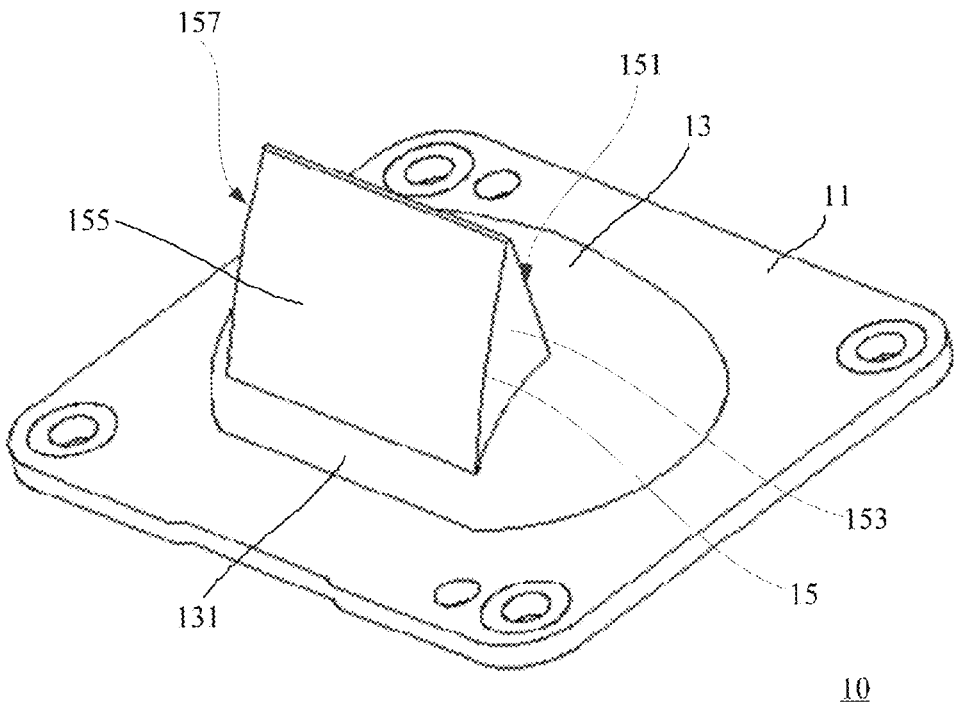
FIG. 1 is a structural diagram of a conventional optical lens applied in an LED lamp.
Figure 2:
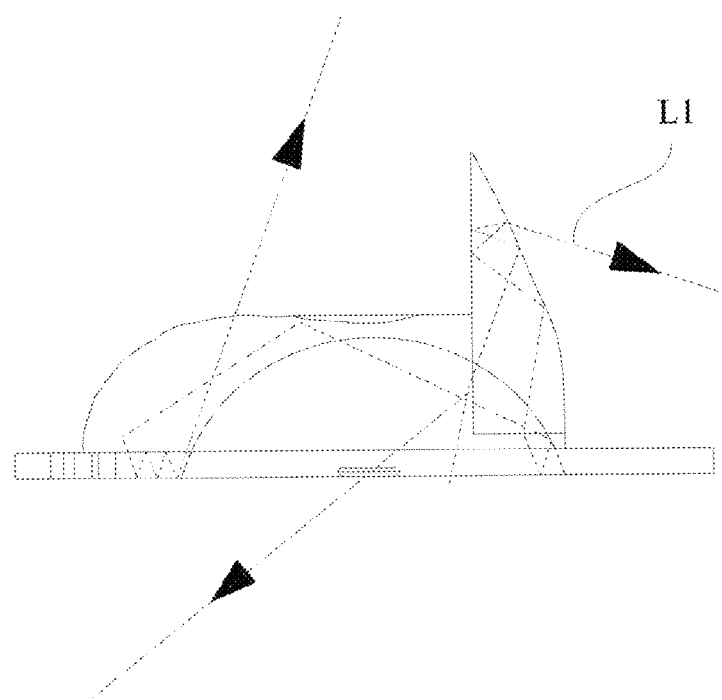
FIG. 2 is a simulation diagram of emitting lights from the optical lens of the LED lamp shown in FIG. 1.
Figure 6:
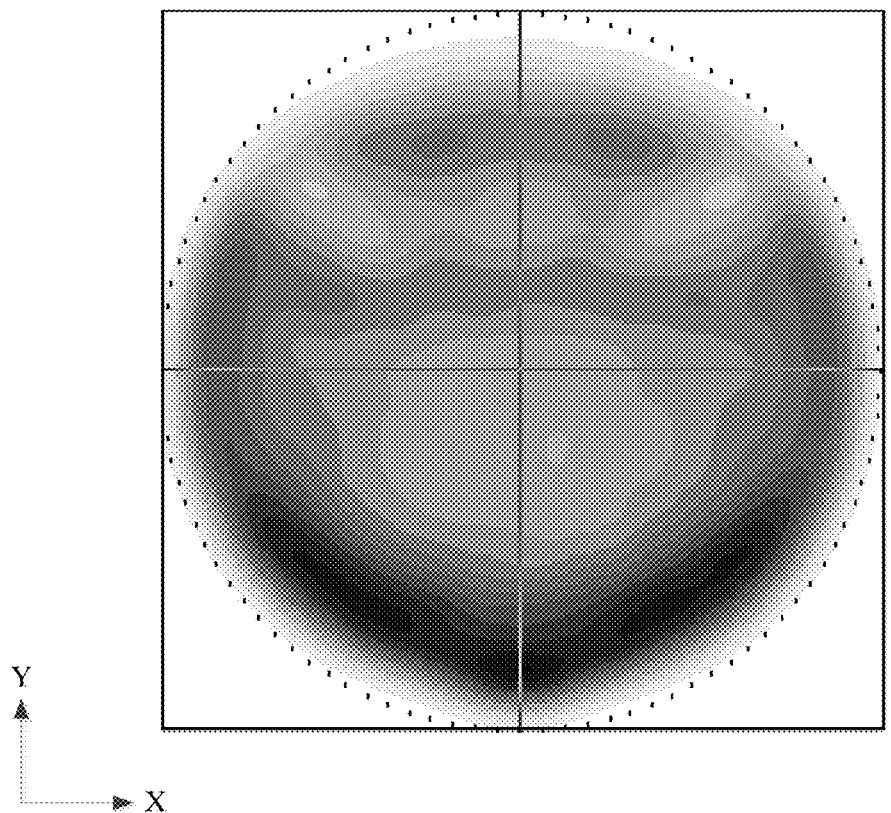
FIG. 6 is a light pattern of the optical lens shown in FIG. 3.
Figure 7:
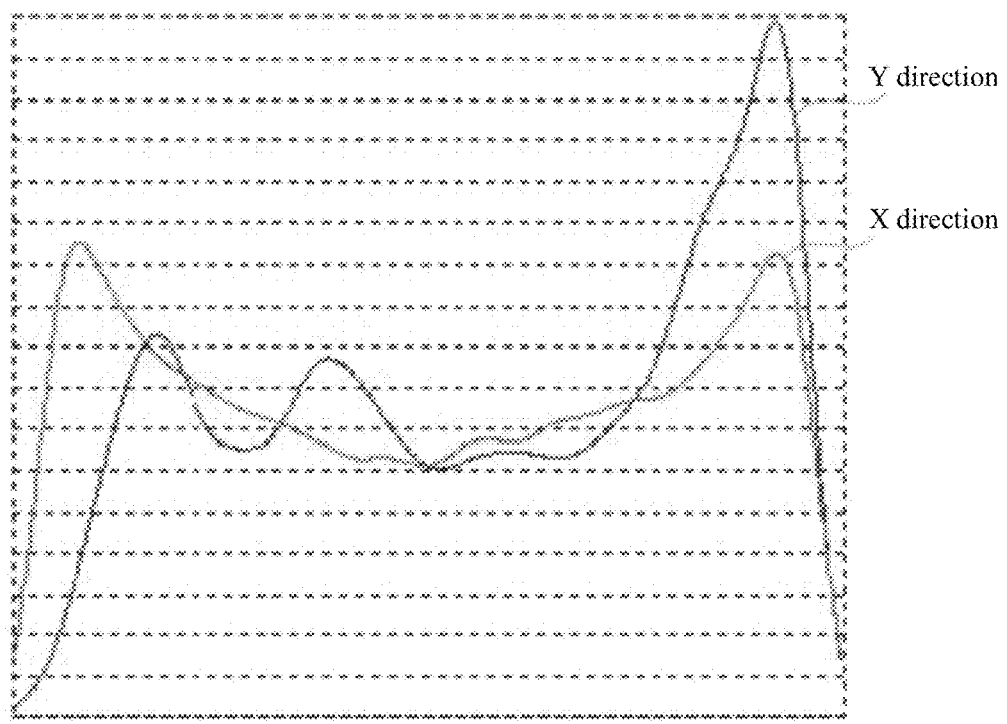
FIG. 7 is a light pattern chart of the optical lens orienting a horizontal direction and a vertical direction.
Figure 8:
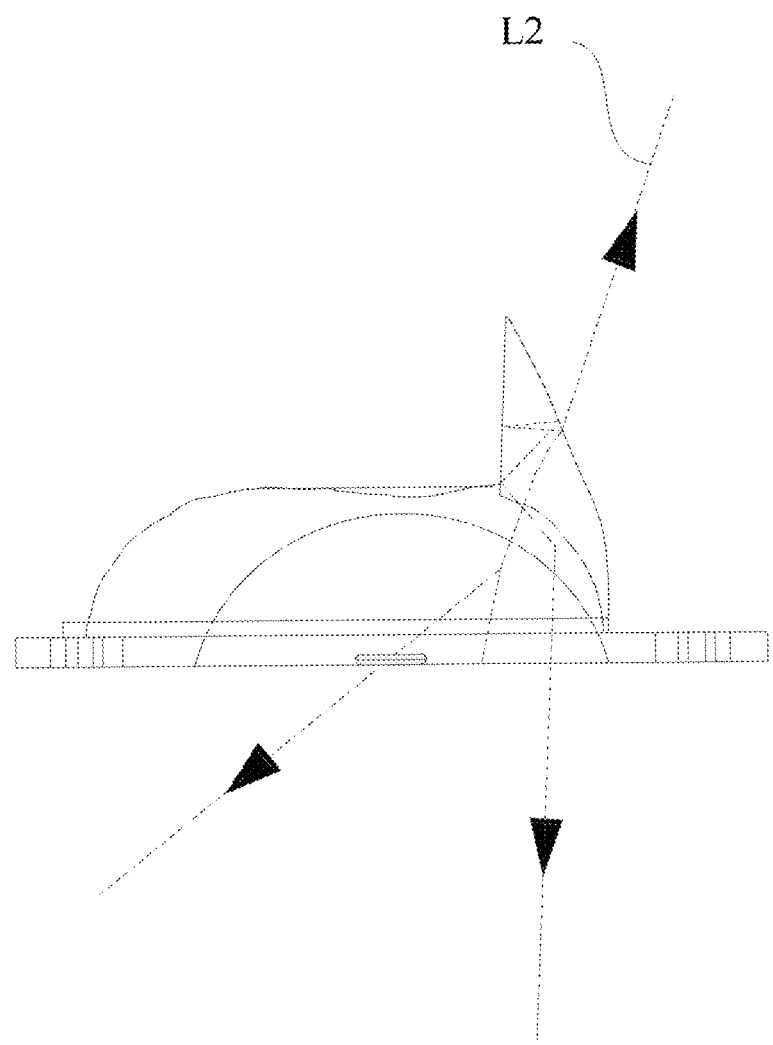
FIG. 8 is a simulation diagram of emitting lights from the optical lens shown in FIG. 3.

In the optical lens 30 above, the first optical side 353 and the first boundary 333 are inclined, when rays hit the first optical side 353, the light transmission direction can be adjusted, in order to improve optical efficiency. To further illustrate the better performance in light emitting of the optical lens 30 above, the disclosure also carries out a trial on the light emitting performance of the optical lens 30, results are shown in FIG. 6~FIG. 8. Obtained light pattern rays distribution has been improved, and flux/emitted flux can attain 0.8798, increased more than 2.5% compared with the conventional optical lens 10 shown in FIG. 1. A better performance in emitting lights of the optical lens 30 can be seen. A ray L2 from a side of the optical lens 30 can be adjusted by the first optical side 353 to emit in a direction closer to a vertical line, which can be seen from FIG. 8. When the optical lens 30 is applied as a streetlight, the ray L2 can hit the road, which can reduce light loss and improve optical efficiency.

Figure 9:
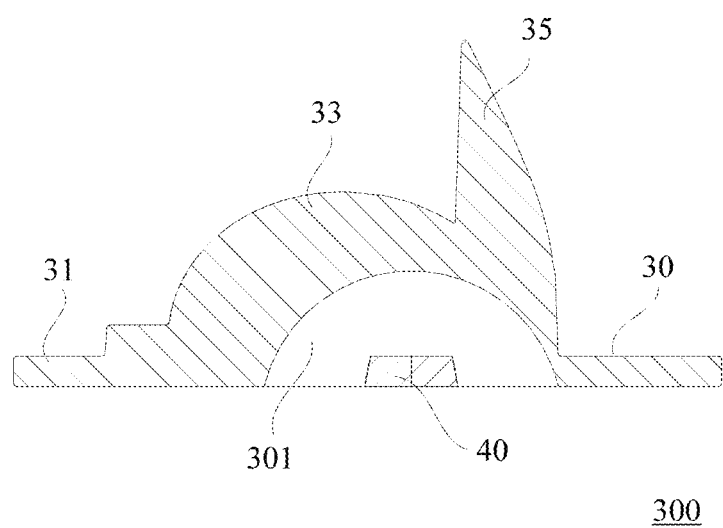
FIG. 9 is a cross-sectional diagram of the optical lens taken along a line IX-IX', and the optical lens and an LED light source are combined to assemble an LED lamp.

Referring to FIG. 9, an LED lamp 300 of another embodiment of the disclosure. The LED lamp 300 includes the optical lens 30 above and an LED light source 40. The optical lens 30 covers the LED light source 40. In the embodiment, a bottom surface of the optical lens 30 contains an accommodating cavity 301. The accommodating cavity 301 can be located right below the dome structure 33 and the protrusion structure 35. The LED light source 40 is disposed in the accommodating cavity 301. Typically, the LED light source 40 can include a chip on board (COB) substrate and one or more LED chips disposed on the COB substrate; moreover, the COB substrate can be connected to a radiator thermally for dissipating heat from the LED lamp, such as the COB substrate is connected to the radiator directly or by a thermal conductive adhesive, subsequently the optical lens 30 and the radiator are connected firmly by a fastener (such as a screw) penetrating the mounting holes 310 defined on the mounting pedestal 31.

Overall, in the optical lens of the embodiment of the disclosure, the first optical side and the first boundary are inclined, cooperating with other light sources. In addition, disposal of the mounting pedestal is optional, it is mainly for improving convenience in mounting an optical lens.

The above description illustrates various exemplary embodiments to explain the principles and implementations of the LED lamp and the optical lens of the disclosure, and the foregoing exemplary embodiments only are used to help understand the solution of the disclosure and its core idea. For a person killed in the art, various modifications and variations can be made according to the concept of the disclosure, and therefore the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical lens, comprising a dome structure and a protrusion structure, the dome structure having an external surface, the protrusion structure being disposed protruding from the external surface of the dome structure; wherein the protrusion structure comprises a first optical surface and a first optical side connected with the first optical surface, the first optical surface and the external surface are connected to form a first boundary, the first optical side and the first boundary are inclined with respect to each other;

wherein the protrusion structure further comprises a second optical surface and a second optical side, the second optical surface and the first optical surface are opposite, the second optical side and the first optical side are opposite, the first optical surface, the first optical side, the second optical surface and the second optical side are connected successively in that order.

2. The optical lens according to claim 1, wherein an angle between the first optical side and the first boundary is 0~75 degrees.

3. The optical lens according to claim 2, wherein the angle between the first optical side and the first boundary is 30 degrees.

4. The optical lens according to claim 1, wherein a shape of the second optical side is same with that of the first optical side.

5. The optical lens according to claim 1, wherein the second optical surface is a curved surface.

6. The optical lens according to claim 1, wherein the first optical surface, the first optical side and the second optical side are planes.

7. The optical lens according to claim 1, wherein the optical lens further comprises a mounting pedestal and a plurality of mounting holes are defined on the mounting pedestal; the dome structure is disposed on the mounting pedestal.

8. The optical lens according to claim 1, wherein the second optical side and the first boundary are inclined with respect to each other; the first optical side and the second optical side each obliquely extend from the second optical surface to the first optical surface and thereby the first optical side and the second optical side are gradually approaching along a direction from the second optical surface towards the first optical surface.

9. A LED lamp, comprising a LED light source and an optical lens covering the LED light source, the optical lens comprising a dome structure and a protrusion structure, the dome structure having an external surface, the protrusion structure being disposed protruding from the external surface of the dome structure; wherein the LED light source comprises a COB substrate and one or more LED chips disposed on the COB substrate; the protrusion structure comprises a first optical surface and a first optical side connected with the first optical surface, the first optical surface and the external surface are connected to form a first boundary, the first optical side and the first boundary are inclined with respect to each other;

wherein the protrusion structure further comprises a second optical surface and a second optical side, the second optical surface and the first optical surface are opposite, the second optical side and the first optical side are opposite, the first optical surface, the first optical side, the second optical surface and the second optical side are connected successively in that order.

10. The LED lamp according to claim 9, wherein an angle between the first optical side and the first boundary is 0~75 degrees.

11. The LED lamp according to claim 10, wherein the angle between the first optical side and the first boundary is 30 degrees.

12. The LED lamp according to claim 9, wherein a shape of the second optical side is same with that of the first optical side.

13. The LED lamp according to claim 9, wherein the second optical surface is a curved surface.

14. The LED lamp according to claim 9, wherein the first optical surface, the first optical side and the second optical side are planes.

15. The LED lamp according to claim 9, wherein the optical lens further comprises a mounting pedestal and a plurality of mounting holes are defined on the mounting pedestal; the dome structure is disposed on the mounting pedestal.

16. The LED lamp according to claim 9, wherein the second optical side and the first boundary are inclined with respect to each other; the first optical side and the second optical side each obliquely extend from the second optical surface to the first optical surface and thereby the first optical side and the second optical side are gradually approaching along a direction from the second optical surface towards the first optical surface.

* * * * *